(12) United States Patent
   Fislage

(10) Patent No.: US 7,603,206 B2
(45) Date of Patent: Oct. 13, 2009

(54) SYSTEM AND METHOD FOR CONTROLLING OR REGULATING THE OPERATIONAL SEQUENCES IN A VEHICLE

(75) Inventor: Markus Fislage, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 831 days.

(21) Appl. No.: 11/187,348

(22) Filed: Jul. 21, 2005

(65) Prior Publication Data

US 2006/0041338 A1    Feb. 23, 2006

(30) Foreign Application Priority Data

Jul. 24, 2004    (DE) .................. 10 2004 036 046

(51) Int. Cl.
   *G06F 17/00* (2006.01)
(52) U.S. Cl. .......................................... 701/1
(58) Field of Classification Search ............. 701/1, 701/48, 29, 36
   See application file for complete search history.

(56) References Cited

U.S. PATENT DOCUMENTS 6,542,076 B1 * 4/2003 Joao ..................... 340/539.14

FOREIGN PATENT DOCUMENTS

| DE | 44 43 218 | 4/1996 |
|---|---|---|
| DE | 195 46 815 | 6/1997 |
| DE | 100 14 994 | 10/2000 |
| DE | 100 27 006 | 12/2001 |
| DE | 103 01 983 | 7/2004 |
| EP | 1 169 686 | 1/2002 |
| GB | 2 367 924 | 4/2002 |

* cited by examiner

*Primary Examiner*—Yonel Beaulieu
(74) *Attorney, Agent, or Firm*—Kenyon & Kenyon LLP

(57) ABSTRACT

A system and a method for controlling or regulating the operational sequences in a vehicle using a number of control units, which are each connected to a communications bus. A central data management unit, on its part, is connected to the communications bus and is designed in such a way that it makes available to the control units, respectively, specific data from a permanent memory. This makes it possible to save having permanent memories in the individual controllers for supplying configuration data of the control units, whereby operating security is increased and expenditure is decreased.

15 Claims, 1 Drawing Sheet

SYSTEM AND METHOD FOR CONTROLLING OR REGULATING THE OPERATIONAL SEQUENCES IN A VEHICLE

FIELD OF THE INVENTION

The present invention relates to a system as well as a method for controlling or regulating the operational sequences in a vehicle, using a number of control units which are each connected to a communications bus.

BACKGROUND INFORMATION

A system is described in German Patent Application No. DE 100 27 006 for controlling/regulating the operational sequences in a motor vehicle, which has a central memory in which all programs are filed that are required for the control/regulation of the operational sequences of a vehicle. At the start of the system, the required programs are loaded into the working memories of the controllers. The idea and the purpose of this known system is to keep centrally available programs and the functionalities connected therewith.

Furthermore, European Patent No. EP 1 169 686 describes a method and a device for storing data in a vehicle for the evaluation of the stored data. The teaching of this document pursues the purpose of recording, classifying and storing dynamic data on the entire life cycle or utilization period of a vehicle, and, in the light of these data, of reconstructing the utilization of the vehicle and the wear of the vehicle between the time of initial operation and any arbitrary readout point. A central memory medium is provided, for storing the data of interest, which is connected to the data bus to which the components delivering the data are also connected. The centrally filed data from units are analyzed in order to find a measure for the utilization or the wear of the vehicle or of its components. Control or regulation of the operational sequences in a vehicle is not provided in this instance.

Modern vehicles include a multitude of controllers which control or regulate the various operational sequences (electromechanical braking (EMB), ABS, air bag electronic units in the vehicle, drive train, electrically operable vehicle elements and other items), most of the controllers being networked with others.

In the following, by control unit, the controller itself or the control unit (ECU, electronic control unit) in a controller is to be understood.

Many control units require permanent memory, more or less to supply the specific configuration data. This permanent memory is mostly realized in the form of EEPROM's (electronically erasable programmable read-only memory). Such EEPROM's make the controllers costly and represent hardware that has to be operated.

Furthermore, these EEPROM's have to be electromagnetically compatible and stable to radiation and so-called "bit dropouts", which, in practice, is often not the case. Consequently, the number of EEPROM's increases the danger of failures or faulty functioning, with correspondingly negative results for the control or regulation of the operational sequences in the vehicle. The control units are usually networked with one another via a communications bus, that is, they are also able to exchange data among themselves. As the communications bus, a CAN system (controller area network) is mostly used these days, a computer-assisted data bus system having serial data transmission.

The control units, that require permanent data, file these in their own permanent memory. Depending on requirements, the data are read from the permanent memory (EEPROM) at start-up or "on demand". For this, usually a driver software module is required. Depending on how sensitive the data are, they are secured using check sums, or even filed in duplicate or triplicate.

A system is to be made available that may be used with greater security and, at the same time, at lower expenditure, for controlling and regulating the operational sequences in a vehicle. Furthermore, a corresponding method is to be described.

SUMMARY OF THE INVENTION

The system according to the present invention provides a central data management unit which is connected to the communications bus, the same as the control units, and which is developed so that it makes available to the control units, respectively, specific data from a permanent memory. Among these specific data, there are particularly the configuration data of the respective controller (or the respective controller). In this system construction, the EEPROM's present up to now in a control unit may be omitted. This lowers costs and increases security with respect to failure in the system named.

The central data management unit represents a data bank functionality which makes available permanent memory via a communications bus (possibly also several interfaces in a unit) to all users on the bus. The data management unit according to the present invention may be a self-sufficient control unit (ECU) or only an addition to such an ECU, which is always present in the vehicle (for instance, as an instrument cluster).

The present invention makes possible the advantage that many units in the vehicle are able to do without their own permanent memory. This, together with the possible renunciation of corresponding driver software, reduces system costs. In addition, because of the centralization of the data bank functionality, costly methods for securing the data (coding concepts such as crypto methods) become very much more economical, since these functions now have to be found only in one unit (the central data management unit). Furthermore, the present invention permits making available more data area per unit (control unit). Finally, the position and the subdivision of the memory are scalable across the vehicle.

It is of advantage if the central data management unit is developed so that, in reverse, it is also able to store specific data of the control units. Consequently, a read and a write operation are possible. Consequently, the central data management unit may, in this design, also collect specific unit data, in order to submit these to a later analysis.

In the system according to the present invention, the communications bus is advantageously executed as a serial data bus, so that a customary CAN controller area network) or even others may be used. These very rapid bus systems permit information exchange among the connected pieces of equipment at high efficiency and performance.

In the case of the method, according to the present invention, for control or regulation of the operational sequences in a vehicle having a number of control units which in each case are connected to a communications bus, it is provided that specific data appertaining to one control unit are permanently stored in the central data management unit, and, if required, are made available to the respective control unit. It follows that the central data management unit manages data and configuration data of completely different controllers in a central fashion.

To do this, it makes sense to assign a virtual address space in this data management unit to the control units, for utilization of the permanent memory of the central data management unit. Then, a virtual address space may be assigned by the vehicle manufacturer may be apportioned to each piece of equipment that wishes to use the permanent memory. This is utilized in order to access the data space via the communications bus. For this, in particular, diagnosis protocols may be used that have been put into the vehicle. To do this, for example, the standard KWP2000 Services ReadDataByAddress and WriteDataByAddress would be sufficient. Bus drivers as well as diagnosis protocols are present in every control unit (ECU) and consequently mean no overhead, i.e. they cause no additional expenditure.

It makes sense to load the (configuration) data made available by the central data management unit into a volatile memory of the respective control unit. One should observe here that, in the case of an interruption in the communications via the communications bus, the control units continue to have to be operated in emergency mode. To do this, it makes sense to operate the control units using appropriately preset parameters which have been stored in a nonvolatile memory (ROM, read only memory) of the respective control unit.

Just the fact that, according to the present invention, the control units collect specific data via the communications bus, does not increase the probability of failure of the system. In any case, it is expedient to trigger (warning) signals when there is an interruption of communications via the bus. Since, in today's vehicles, the full performance reliability of a multitude of pieces of equipment is no longer ensured without the bus communications, a ride to the repair shop would anyhow be imperative.

It is meaningful if the boot up data are transmitted by the central data management unit directly to the respective control unit via the communications bus.

In order to manage this transmission as quickly as possible, that is, without communications overhead, a certain region of the virtual address space should be distributed without flow control directly via the bus. The so-called "flow control" that is otherwise used in the case of data transmission, consisting of "questions", "answers", "testing" and "confirming" would take too long during the booting up of the system. The data could then be indexed via a message identifier directly to the receivers (e.g. CAN messageIdentifier?KMatrix). If a piece of equipment should still miss data, it may scan these later via a standard access.

DETAILED DESCRIPTION

Figure 1:
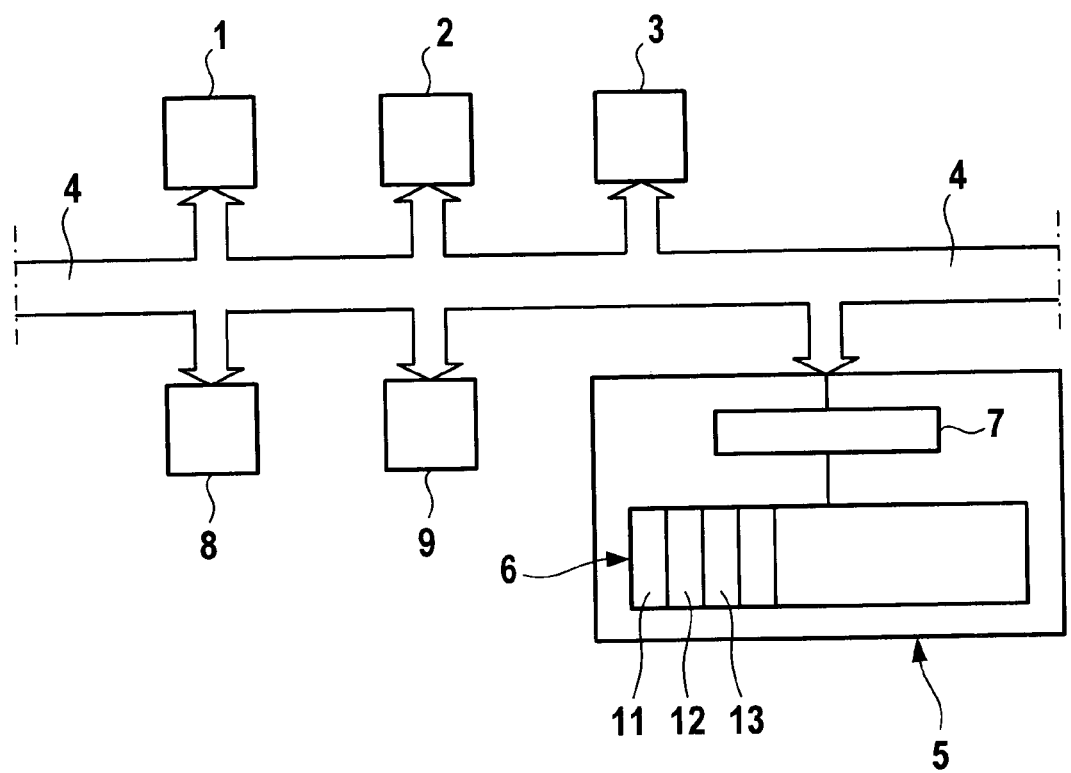
FIG. 1 shows schematically the specific embodiment of a system according to the present invention for controlling or regulating the operational sequences in a vehicle.

The system shown schematically in FIG. 1 shows various control units 1, 2 and 3, which may represent controllers in a motor vehicle, for example, which share responsibility for the driving (brakes, transmission, engine, instrument cluster, air bag). Other controllers are on board in a motor vehicle, responsible for instance, for electrically operable vehicle elements, such as door, roof and seats, and other controllers again are responsible for electronic pieces of equipment, such as CD players, navigation, air conditioning, etc. Such additional control units are not reflected in detail in FIG. 1, but individual representatives of such control units/control equipment are just marked 8 and 9.

The controllers in a motor vehicle are networked with one another via communications bus 4, in order to be able to exchange data with one another. Networking of the controllers is necessary, since frequently the mutual scanning of data is imperative for a flawless regulation of the operational sequences. This networking may, for example, be implemented by a so-called CAN bus (controller area network). Using such a serial bus system, data transmission of 10 megabit/s is possible, whereby an effective information exchange may be ensured among the control units.

According to the present invention, a data management unit 5 is provided which, on its part, is connected to communications bus 4. This management unit, that is shown here only schematically, includes a computing device 7 as well as a memory. Computing device 7 is responsible particularly for the data exchange with the individual control units 1, 2 and 3, and it receives appropriate driver software and, to the extent that data security makes it necessary, coding logic or encoding logic, as well as, possibly, additional functionalities.

Memory 6 of data management unit 5 is, as indicated in FIG. 1, subdivided into various address spaces 11, 12, 13. In this instance, physical memory segments or virtual address spaces may be involved. In this exemplary embodiment, virtual address space 11 is allocated to control unit 1, virtual address space 12 is allocated to control unit 2, and so forth.

In the system according to the present invention, control units 1, 2 and 3 do not include their own EEPROM's, which makes possible a cost-effective implementation. In addition, the expenditure is reduced for a possibly required new programming of these EEPROM's, and the operating security is increased (on account of failure or the faulty functioning of individual EEPROM's). The EEPROM's named are, so to speak, replaced completely or partially by data management unit 5 using its memory 6, control units 1, 2, 3 acquiring control unit-specific data from central data management unit 5, when the system is brought up or when necessary. This type of data transmission is controlled by computing unit 7 of data management unit 5. When the system is brought up, it makes sense to load the configuration data of individual control units 1, 2, 3 directly into these controllers without having the data checked by diagnosis protocols. Such a flow control, in which sender and receiver mutually confirm the correct data transmission in a query/response dialog could take too long during the bringing up of the system, that is, at the starting of the vehicle.

It is also of advantage if control units 1, 2, 3 have stored emergency parameters in a nonvolatile memory in the respective controller itself. Controllers already have available such a nonvolatile memory (ROM), which includes the specific programs of the respective controller. In this way, it may be ensured that, upon breakdown of communications bus 4, control units 1, 2, 3 have access to preset parameters which make possible an emergency operation. In each case, the breakdown of bus 4 has to be indicated to the driver.

The data transmission, according to the present invention, between data management unit 5 and control units 1, 2, 3 may be implemented without additional expenditure (overhead) for bus drivers, diagnosis protocols and transport protocols. Since data management unit 5 itself may be regarded as a control unit, the additional expenditure is low, but, because of saving of the EEPROM's and the increase of the data security, the benefit of the present invention is enormous.

What is claimed is:

1. A system for controlling or regulating operational sequences in a vehicle, comprising:
   a communications bus;
   a plurality of control units, connected to the communications bus; and
   a central data management unit which, on its part, is connected to the communications bus, the central data management unit including a computing device and a permanent memory, the central data management unit making available to the control units, respectively, specific data from the permanent memory.

2. The system according to claim 1, wherein the central data management unit stores the specific data of the control units.

3. The system according to claim 1, wherein the central data management unit itself represents one of (a) a control unit and (b) an addition to a control unit present in the vehicle.

4. The system according to claim 1, wherein the communications bus is a serial data bus.

5. A method for controlling or regulating operational sequences in a vehicle using a plurality of control units, which are each connected to a communications bus, the method comprising:
  permanently storing specific data associated with at least one respective control unit in a central data management unit that includes a computing device, the central data management unit being connected to the communications bus; and
  making available the specific data from the computing device to the respective control unit as required.

6. The method according to claim 5, wherein specific data of each of the control units are stored in the central data management unit.

7. The method according to claim 5, further comprising:
  loading the data made available by the central data management unit into a volatile memory of the control unit.

8. The method according to claim 5, further comprising:
  respectively assigning a virtual address space in a memory of the data management unit to the control units for a utilization of a permanent memory of the central data management unit.

9. The method according to claim 5, further comprising:
  using at least one of (a) transport protocols, (b) diagnosis protocols and (c) bus drivers, that are available in the vehicle, for communications between the control units and the data management unit via the communications bus.

10. The method according to claim 5, further comprising:
  in case of an interruption of communications via the communications bus, operating the control units using preset parameters in an emergency mode.

11. The method according to claim 5, further comprising:
  transmitting the data from the central data management unit required for bringing up a system directly to the respective control unit via the communications bus.

12. The method according to claim 5, further comprising:
  loading the data made available by the central data management unit into a volatile memory of the control unit;
  respectively assigning a virtual address space in a memory of the data management unit to the control units for a utilization of a permanent memory of the central data management unit; and
  using at least one of (a) transport protocols, (b) diagnosis protocols and (c) bus drivers, that are available in the vehicle, for communications between the control units and the data management unit via the communications bus;
  in case of an interruption of communications via the communications bus, operating the control units using preset parameters in an emergency mode; and
  transmitting the data from the central data management unit required for bringing up a system directly to the respective control unit via the communications bus;
  wherein specific data of each of the control units are stored in the central data management unit.

13. The system according to claim 1, wherein:
  the data made available by the central data management unit is loadable into a volatile memory of the control unit;
  a virtual address space in a memory of the data management unit is respectively assignable to the control units for a utilization of a permanent memory of the central data management unit; and
  at least one of (a) transport protocols, (b) diagnosis protocols and (c) bus drivers, that are available in the vehicle, is used for communications between the control units and the data management unit via the communications bus;
  for an interruption of communications via the communications bus, the control units are operated using preset parameters in an emergency mode; and
  the data from the central data management unit required for bringing up a system directly to the respective control unit are transmittable via the communications bus;
  wherein specific data of each of the control units are stored in the central data management unit.

14. The system according to claim 1, wherein the central data management unit stores the specific data of the control units, wherein the central data management unit itself represents one of (a) a control unit and (b) an addition to a control unit present in the vehicle, and wherein the communications bus is a serial data bus.

15. The system according to claim 1, wherein the computing device exchanges data with the plurality of control units, and wherein the computing device receives driver software.

* * * * *

UNITED STATES PATENT AND TRADEMARK OFFICE
CERTIFICATE OF CORRECTION

PATENT NO.      : 7,603,206 B2                                          Page 1 of 1
APPLICATION NO. : 11/187348
DATED           : October 13, 2009
INVENTOR(S)     : Markus Fislage It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1118 days.

Signed and Sealed this

Fifth Day of October, 2010

David J. Kappos
*Director of the United States Patent and Trademark Office*